(12) United States Patent
Öhman

(10) Patent No.: US 8,695,791 B2
(45) Date of Patent: Apr. 15, 2014

(54) CARRIER PUCK

(75) Inventor: Michael Öhman, Mölndal (SE)

(73) Assignee: FlexLink Components AB (SE)

( * ) Notice: Subject to any disclaimer, the term of this patent is extended or adjusted under 35 U.S.C. 154(b) by 0 days.

(21) Appl. No.: 13/393,769

(22) PCT Filed: Aug. 31, 2010

(86) PCT No.: PCT/SE2010/050924
§ 371 (c)(1),
(2), (4) Date: May 18, 2012

(87) PCT Pub. No.: WO2011/028166
PCT Pub. Date: Mar. 10, 2011

(65) Prior Publication Data
US 2012/0228094 A1      Sep. 13, 2012

(30) Foreign Application Priority Data
Sep. 4, 2009   (SE) ........................ 0950635

(51) Int. Cl.
*B65G 17/00*   (2006.01)
*B65G 47/51*   (2006.01)

(52) U.S. Cl.
USPC ............ 198/867.01; 198/867.11; 198/867.14; 198/803.14

(58) Field of Classification Search
None
See application file for complete search history.

(56) References Cited

U.S. PATENT DOCUMENTS

| 3,941,237 A | 3/1976 | MacGregor, Jr. |
| 4,664,248 A | 5/1987 | Goodman, Jr. et al. |
| 4,729,413 A | 3/1988 | Shults |
| 4,747,482 A | 5/1988 | Sanno |
| 5,255,776 A | 10/1993 | Grecksch et al. |
| 5,484,052 A | 1/1996 | Pawloski et al. |
| 5,579,695 A | 12/1996 | Cockayne |
| 5,897,090 A | 4/1999 | Smith |
| 5,941,366 A | 8/1999 | Quinlan et al. |
| 6,176,369 B1 * | 1/2001 | Petrovic .................. 198/867.11 |
| 6,343,690 B1 | 2/2002 | Britton et al. |
| 6,971,506 B2 * | 12/2005 | Hassinen et al. ......... 198/803.14 |
| 2004/0124109 A1 | 7/2004 | Hassinen et al. |

FOREIGN PATENT DOCUMENTS

| CA | 2248565 A1 | 3/2000 |
| EP | 1393080 B1 | 7/2008 |
| GB | 2256629 A | 12/1992 |

OTHER PUBLICATIONS

"International Application Serial No. PCT/SE2010/050924, International Preliminary Report on Patentability dated Aug. 29, 2011", 7 pgs.
"International Application Serial No. PCT/SE2010/050924, Written Opinion mailed Dec. 20, 2010", 6 pgs.
"International Application Serial No. PCT/SE2010/050924, International Search Report mailed Dec. 20, 2010", 4 pgs.

* cited by examiner

*Primary Examiner* — Kavel Singh
(74) *Attorney, Agent, or Firm* — Schwegman Lundberg & Woessner, P.A.

(57) ABSTRACT

Various embodiments include a carrier puck for a conveyer system, the carrier puck comprising a circular lower body, and an upper body attached to the circular lower body, and where the puck further comprises a slide ring arranged in a ring groove positioned above a lower contact surface of the lower body.

7 Claims, 3 Drawing Sheets

CARRIER PUCK

RELATED APPLICATIONS

This application is a nationalization under 35 U.S.C. 371 of PCT/SE2010/050924, filed Aug. 31, 2010 and published as WO 2011/028166 A1 on Mar. 10, 2011, which claims priority to Sweden Patent Application No. 0950635-3, filed Sep. 4, 2009; which applications and publication are incorporated herein by reference in their entirety.

TECHNICAL FIELD

The present invention relates to a carrier puck comprising a slide ring to be used in a conveyor system.

BACKGROUND ART

Conveying devices, such as those which are used for moving objects between different stations in a factory, usually comprise a conveying track in the form of a belt or a chain. The conveying tracks can be recessed in a trench with vertical side surfaces. Alternatively, they can be located on the horizontal upper surfaces of the trench or arranged in some other way.

The objects to be conveyed are arranged slidably in relation to the conveying tracks, either directly or via supporting means. Larger objects are often conveyed on supporting means also known as pallets, and smaller objects may be conveyed using a small carrier often referred to as a carrier puck.

A supporting means is conveyed along the conveying track, which may comprise different work stations. The work stations may either be positioned along the conveying track such that all objects will pass all work stations. In this way, all objects must stop at the same time, regardless if an object is to be manipulated at a work station or not. Such an arrangement is not very flexible and is mostly used when all objects are to be manipulated in the same manner, and when the manipulation requires only a short time duration.

In more flexible systems, where different work stations can perform different operations on different objects, the work stations are separated from the main conveyor track. In such a system, each object can be directed to any work station without disturbing the flow on the main conveyor track. The duration of an operation at a work station will thus not affect the other objects. An object is directed into a side track by a diverting station. In order to be able to divert an object into a side track, the diverting station must be able to catch the right object from the main object flow and to move it out of the flow. If there are many objects travelling next to each other in the main flow, bearing on each other, the force required to move the puck out of the flow will be relatively high.

When a diverter disc grips the puck and moves it out of the main flow, the puck will be subjected to a rotational movement since the diverter disc rotates. The puck may rotate during the diversion but will most likely not rotate in relation to the diverter disc. With several other pucks bearing on the first puck, the diverter disc will have to overcome the force from the other pucks bearing on each other. This will lead to either that the first puck glides with a friction against the other pucks or that all the other pucks will also rotate, or a combination of both. When a puck rotates, it will rub against the conveyor rails and possible against the neighbouring pucks. In either case, a relatively high force must be exerted by the diverter disc due to the friction between the pucks and the force applied on the pucks by the conveyor track in the direction towards the first puck.

One way of solving this problem is to introduce an extra stop function before the diverter station. The stop will interrupt the main flow such that the puck can easily be directed out from the main conveyor track. Each stop is however an unnecessary cost and it also requires additional space.

Another possibility is to use a motor that is strong enough to overcome the friction from the pucks in the main flow. When a puck is directed out of the main flow by a diverter disc, the puck will be rotated by the diverter disc during the diversion. When other objects bear on the first object, the diverter disc must overcome the force from all other objects during the diversion. This requires a relatively large drive unit, which may be an electrical motor. In a large system having several work stations, the total power requirement will thus be unnecessarily high.

EP 1393080 B describes a conventional circular carrier puck adapted for the use with test tubes. The carrier puck can be used in a system as described above.

GB 2256629 A describes a circular package transport puck having fingerlike projections for holding a package. The fingerlike projections may have ring-like tapered elements on their upper ends to allow the puck to roll on an axis perpendicular to the base. The transport puck can be used in a system as described above.

U.S. Pat. No. 6,176,369 B, US 2004124109 A, U.S. Pat. No. 4,729,413 A, CA 2248565 A, U.S. Pat. Nos. 5,484,052 A, 5,897,090 A and 3,941,237 A all show different examples of circular carrier pucks that can be used in a system as described above.

All these carrier pucks will work fine in some systems, but may anyhow be subjected to the above mentioned problem. There is thus still room for improvements.

DISCLOSURE OF INVENTION

An object of the invention is therefore to provide an improved carrier puck having a slide ring. A further object of the invention is to provide a carrier puck that can easily be disassembled in order to exchange a broken or worn part. Another object of the invention is to provide a circular carrier puck that can be oriented in a specific orientation position.

In a carrier puck for a conveyer system, comprising a circular lower body, and an upper body attached to the lower body, the object of the invention is achieved in that the carrier puck further comprises a rotatable slide ring arranged in a ring groove positioned above a lower contact surface of the lower body.

By this first embodiment of the carrier puck according to the invention, the carrier puck can be manipulated by different means at the conveyor track, such as diverters and mergers, in an efficient and cost-effective way. Because the manipulator will grip the puck at the slide ring, the manipulation will not require as much power as when manipulating conventional pucks, since the manipulating means and the puck will be able to move relative each other. This will improve the performance of the system.

In an advantageous development of the invention, the largest diameter of the carrier puck is larger than the outer diameter of the slide ring. This will improve the performance of the system further, since the pucks bearing on each other on a conveyor track must not be rotated when a first puck is manipulated by the slide ring. This will allow for a more simple system with fewer components, since e.g. specific puck stops will not be required at a manipulating station.

In an advantageous development of the invention, the largest diameter of the carrier puck is smaller than the outer diameter of the slide ring. In this way, the slide rings of different pucks will bear on each other. This will improve the performance of the system, since the individual pucks on a conveyor track must not be rotated when a first puck is manipulated by the slide ring. Instead, the slide rings will rotate.

In an advantageous development of the invention, the slide ring is provided with roller elements. In this way, the slide ring will act as a roller bearing towards the carrier puck. This will improve the performance of the system further, since the friction between the puck and the slide ring will be reduced. This is of advantage e.g. when larger and/or heavier items are to be transported by the carrier puck.

In another advantageous development of the invention, the carrier puck further comprises an orientation ring having an orientation section and a position section. This makes it possible to align the carrier puck in a specific orientation direction. The orientation section may comprise teeth.

In another advantageous development of the invention, the carrier puck further comprises an identification means. This allows for an identification of the object being conveyed by the carrier puck in an easy way. In this way, objects of different kinds can be conveyed on the same conveyer track.

In another advantageous development of the invention, the lower body and the upper body of the carrier puck comprises attachment means such that the upper body can be detached from the lower body. This allows for an easy replacement of broken or worn parts of the carrier puck. This also makes it easy to modify a carrier puck to different objects that are to be conveyed.

In another advantageous development of the invention, the lower body and the upper body of the carrier puck are fixedly attached to each other. This provides a cost-effective and simple solution, especially when there is a demand for a high number of the same carrier puck assembly.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
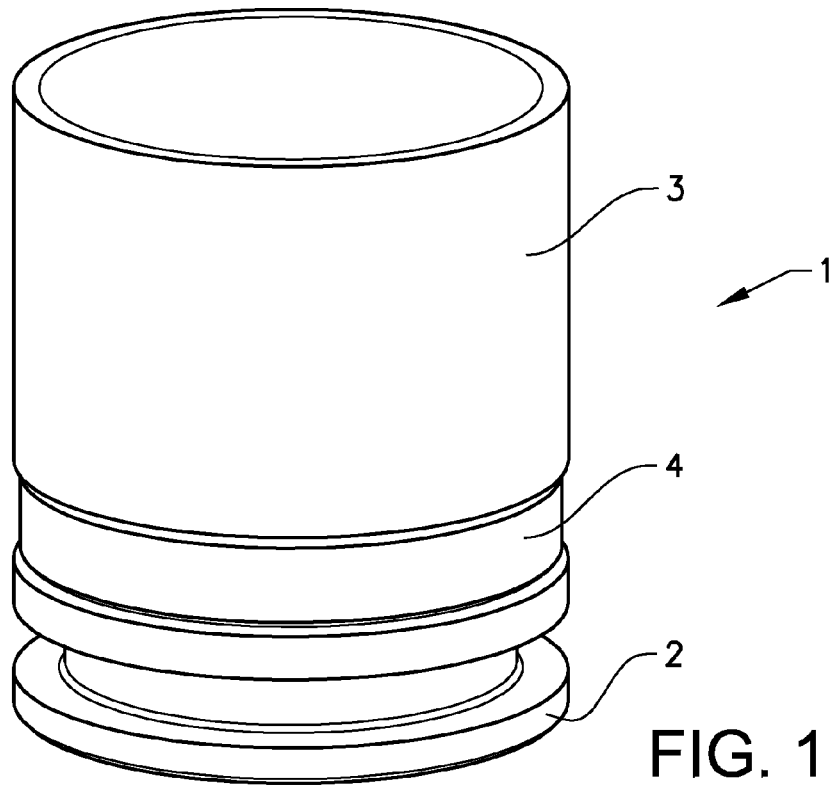
FIG. 1 shows a side view of a first embodiment of a carrier puck according to the invention.
Figure 2:
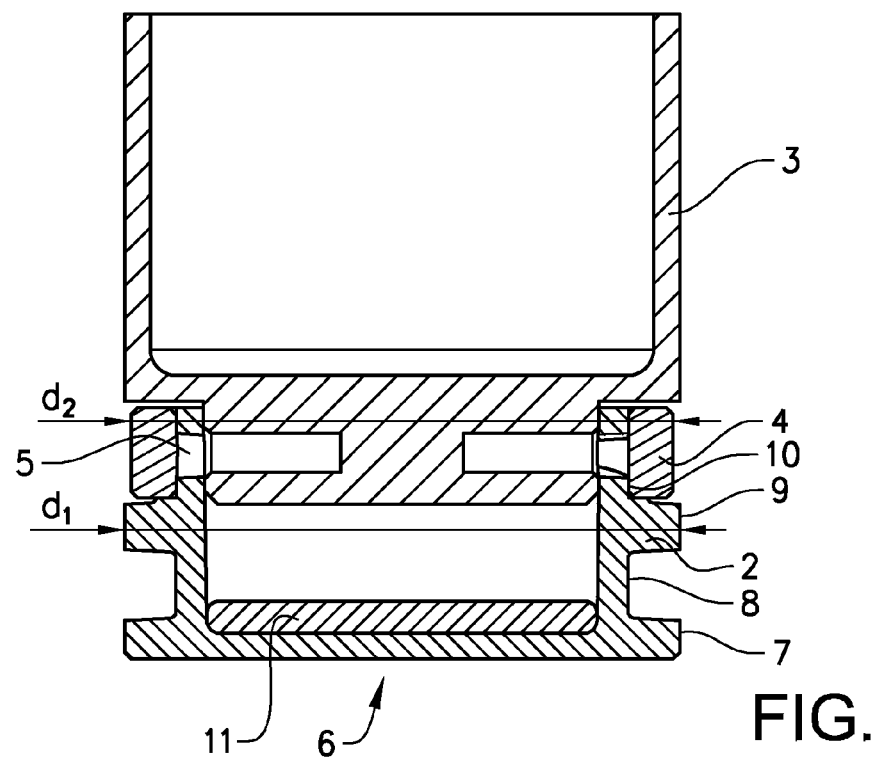
FIG. 2 shows a split view of the first embodiment of a carrier puck according to the invention.

FIGS. 1 and 2 show a first embodiment of a carrier puck for a conveyor system according to the invention. The carrier puck 1 comprises a lower body 2, an upper body 3 and a slide ring 4. The lower body 2 is circular in shape and comprises a base surface 6, a lower contact surface 7, a guide groove 8, an upper contact surface 9 and a ring groove 10. The puck is transported on a conveyor track by standing on the base surface. The lower contact surface 7 and the upper contact surface 9 are used when a puck bears on another puck or against another surface. The diameter of the lower contact surface and the upper contact surface are preferably the same, and will also in this embodiment represent the largest diameter of the complete puck. In this way, the pucks can bear on each other without the risk of tipping over.

The guide groove 8 can be used for guiding the puck on the conveyor track. If guiding of the puck is required, the conveyor track will comprise rails which will correspond to the guide groove. In this way, the puck will be secured to the track and will not be able to fall off or to tip over. The rails are applied where necessary.

The lower body further comprises attachment means 5 that are used to attach the upper body to the lower body. In the shown example, the attachment means are in the form of a bayonet coupling with bayonet recesses in the lower body and bayonet protrusions in the upper body. Other attachment means are of course also conceivable, such as threads or releasable snap locks. The attachment means may, as shown in this example, be dismountable such that the upper body can be detached from the lower body. The advantage of this is that parts of the puck can be replaced when broken or worn, or that the upper body can be exchanged with another body adapted for another use. In this way, the puck or part of the puck can be reused when a production line is altered or shut down.

When the puck does not need to be disassembled, the upper and lower body may also be fixedly mounted to each other, e.g. by screws, glue, bonding, snap locks or the like, depending e.g. on the material of the upper and lower body. The upper and lower body may also be integrated with each other, such that they make up a single part. The puck may also be provided with an identification means 11 adapted to identify the carrier puck or the object carried by the carrier puck. The identification means may be a contactless identification means working with radio transmission, e.g. an RFID-tag that can be either fixedly integrated in the lower body or that can be removable positioned inside the lower body. Such an identification means has the advantage that it insensitive to the orientation of the carrier puck. An identification means in the form of an optically readable means, e.g. a bar code, may be applied to the outside of the carrier puck. Such an identification means is preferably used when the carrier puck is provided with orientation means that can align the puck in a specific orientation. It is also possible to apply the identification means on the object that is conveyed by the carrier puck.

The diameter of the upper body is preferably smaller than the diameter of the contact surfaces of the lower body when the upper body is circular. If the upper body is of another shape, it is preferred that the upper body does not protrude outside of the lower body in a vertical direction. In this way, the puck will only bear on another puck or another surface by the contact surfaces. Since the contact surfaces are positioned at the lower part of the puck, this will ensure that the puck is stable. The inner and upper part of the upper body is adapted to the objects that are to be conveyed. Such objects may include, depending on e.g. the size of the puck, test tubes, mechanical parts, assemblies, medical packages and others.

The slide ring 4 is mounted in the ring groove 10. The dimensions of the ring groove and the slide ring are such that the slide ring can easily rotate in the ring groove when the puck is assembled. The outer diameter of the slide ring is in the first embodiment smaller than the diameter of the contact surfaces. In this way, the slide ring will not protrude from the body of the puck. The slide ring 4 is positioned at a height that corresponds to the height of e.g. a diverter disc or another handling unit. This means that the diverter disc will be able to hold the puck by the slide ring. The friction between the slide ring and the holding surface of the diverter disc will hold the slide ring in a fixed position in relation to the holding surface during a diversion of the puck.

The puck is preferably made from a low-friction material such that the puck will be able to glide against the conveyor track when the pucks are stopped, e.g. at a work station or a diverter station. Such a low-friction material may be a suitable plastic material, e.g. a polyamide, an acetal resin or a conductive acetal resin. At least the lower body of the puck is preferably made from this material. The slide ring may also be made from such a plastic, or may be made from a metal in order to have an improved wear resistance. The slide ring may also be designed as a roller bearing comprising roller elements in order to further reduce the friction and to increase the wear resistance.

Figure 3:
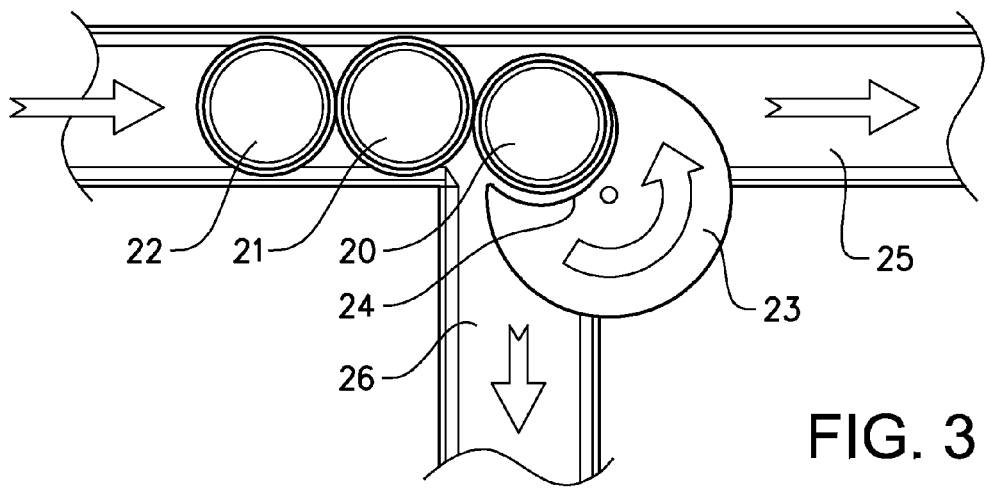
FIGS. 3-5 shows an inventive puck being diverted by a diverter disc at a conveyor track.
Figure 4:
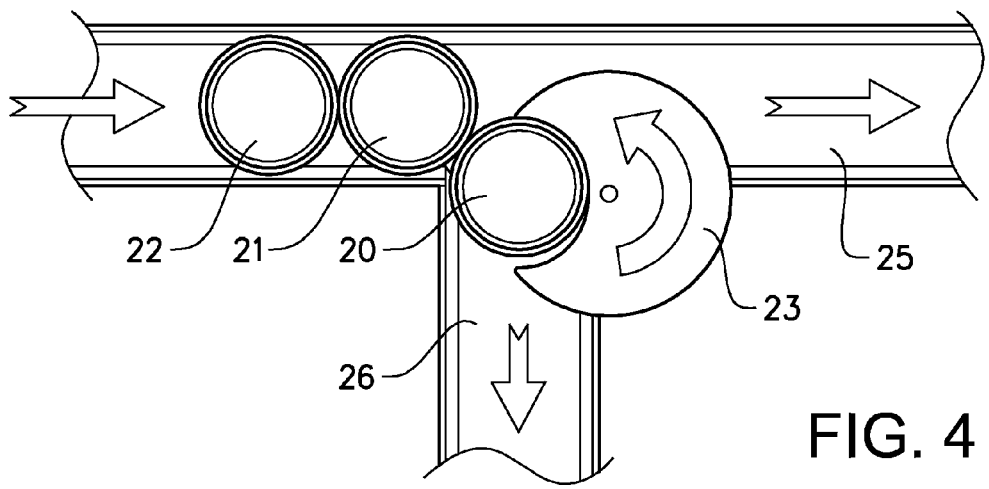
Figure 5:
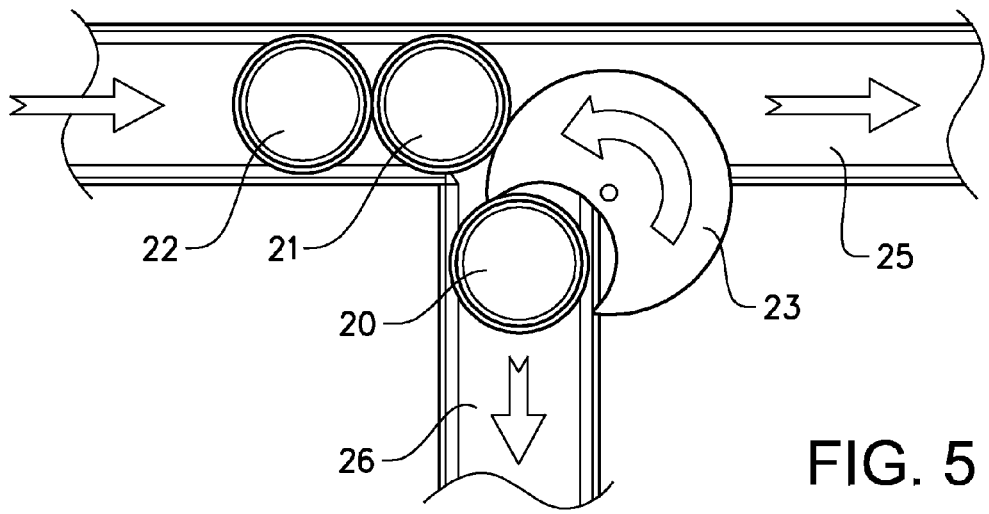

An example of a diversion of a puck is shown in FIGS. 3 to 5. In this example, a plurality of pucks are conveyed on a first conveyor track 25 and a first puck 20 is to be diverted onto a second conveyor track 26 by a diverter disc 23. The travelling direction of the conveyor tracks are indicated with arrows. The diverter disc is provided with a circular holding recess 24 corresponding to the size of the slide ring of a puck. In FIG. 3, a first puck 20 has entered the holding recess of the diverter disc being in a first position. A puck train with a leading second puck 21 bears on the first puck and is pushed against the first puck with a force that depends on the weight of each puck and the friction between the conveyor track and the puck train.

In FIG. 4, the diverter disc rotates in a counter-clockwise direction indicated by an arrow. The puck will follow the diverter disc. Because of the slide ring, the puck will not be fixed to the diverter disc during this movement, but will be able to rotate relative the diverter disc. The puck will thus be able to roll against the second puck, during the diversion movement. In this way, the second puck and the other pucks in the puck train must not be rotated by the first puck, which is the case for a conventional puck that is not provided with a slide ring. Since the pucks in the puck train do not have to be rotated, less force is required to rotate the diverter disc. There is also no need to introduce a puck stop in order to stop the puck train in order to relieve the first puck during the diversion.

In FIG. 5, the diverter disc has rotated to its second position where the first puck is diverted to the second conveyor track. When the first puck has left the holding recess, the diverter disc can be rotated in a clockwise direction back to the first position in which it will catch the second puck which is next in turn. When the diverter disc rotates back to the first position, the outer surface of the diverter disc will be in contact with the slide ring of the second puck. The slide ring will thus rotate in relation the second puck, and the second puck will not rotate. When a conventional puck is used, either the pucks in the puck train must be rotated or the outer surface of the diverter disc must slide against the puck. Rotating the puck train will require a relatively strong motor for the diverter disc, and sliding the outer surface of the diverter disc against the puck will also require unnecessary power and will also induce wear on the surfaces.

When the second puck is caught by the diverter disc, it can either be diverted onto the second conveyor track by a counter-clockwise rotation or it can be forwarded on the first conveyor track by a clockwise rotation. When the puck is forwarded, the outer surface of the diverter disc will cause the slide ring of the third puck 22 to rotate, which means that the third puck can keep its orientation and that less force is required.

In a second embodiment, the diameter of the slide ring is larger than the diameter of the puck. In this embodiment, the diverter disc will still be able to catch the puck by the slide ring, but the pucks in a puck train will bear on the slide ring of each other. When such a puck is diverted, the slide rings of all the pucks will rotate. Such an arrangement is thus better to use when a puck train is relatively short. The pucks will still be able to keep their orientation when a first puck is diverted or forwarded.

Figure 6:
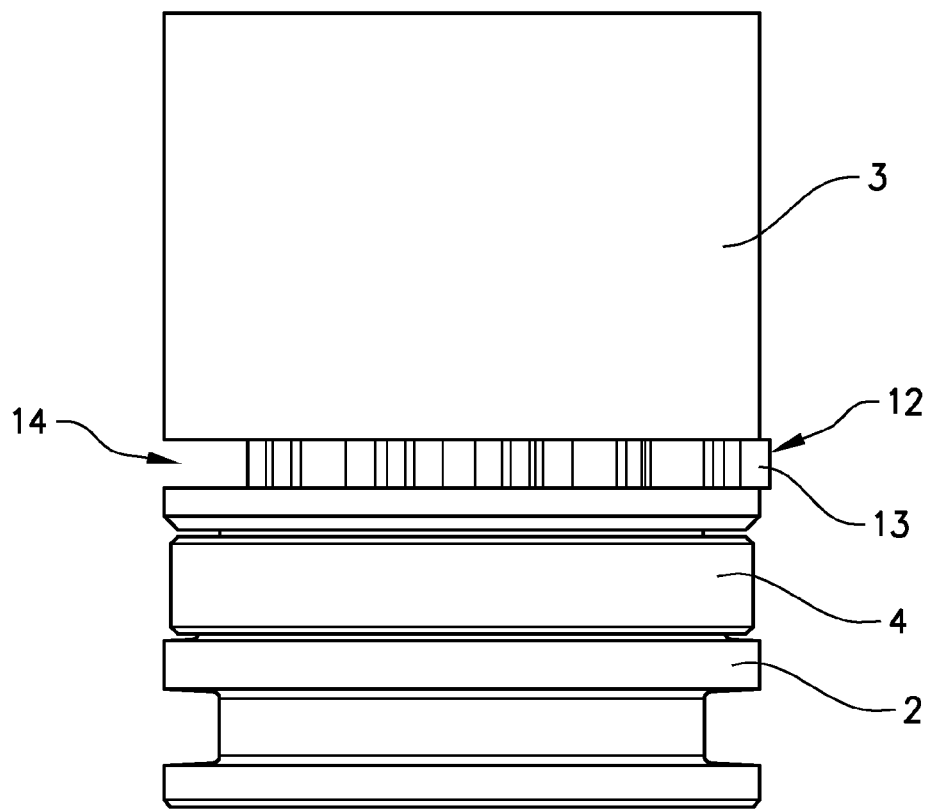
FIG. 6 shows a side view of a second embodiment of a carrier puck according to the invention.

In a development of the inventive puck, shown in FIG. 6, an orientation ring 12 positioned above the slide ring is also provided. The orientation ring is preferably provided on the lower part of the upper body. In this way, the same lower body can be used for all different types of pucks. The orientation ring is used to give the puck a specific orientation. This can be of use e.g. at a work station where the operation to be performed requires that the object is directed in a specific way. The orientation ring may be integrated with the upper body, e.g. by injection moulding, or may be removable from the upper body. The inner surface of the orientation ring may in that case be provided with index grooves 15 in order to position the orientation ring with a specific orientation relative the upper body. This is of advantage when the object that is to be conveyed is oriented in a specific direction in the upper body.

Figure 7:
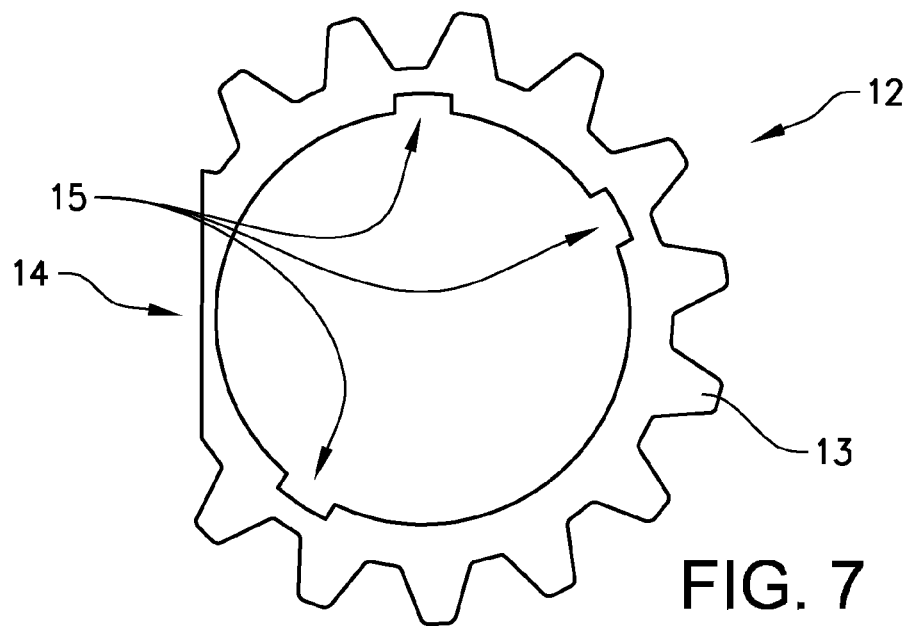
FIG. 7 shows an embodiment of an orientation ring for a carrier puck according to the invention.

Preferably, the orientation ring comprises an orientation section that is used to rotate the puck to the specific orientation position and a position section that will hold the puck in that position. It is also possible to have more than one position section when the object is symmetrical and may be orientated in two or more equal orientation positions. The orientation ring is adapted to cooperate with a specific orientation rail that is provided at positions of the conveyor track where a specific orientation of the puck is required. In FIG. 7, one embodiment of such an orientation ring is shown. The orientation section 13 comprises a number of teeth that will grip a toothed rail and that will thus rotate the puck when it is conveyed by the conveyor track. When the orientation position is reached, the rotation of the puck is stopped and the position section 14 that comprises a flat area will ride against the orientation rail.

The invention is not to be regarded as being limited to the embodiments described above, a number of additional variants and modifications being possible within the scope of the subsequent patent claims. The puck may have any size and may be made from any suitable material.

REFERENCE SIGNS

1: Carrier puck
2: Lower body
3: Upper body
4: Slide ring
5: Attachment means
6: Base surface
7: Lower contact surface
8: Guide groove
9: Upper contact surface
10: Ring groove
11: Identification means
12: Orientation ring
13: Orientation section
14: Position section
15: Index groove
20: First puck
21: Second puck
22: Third puck
23: Diverter disc
24: Holding cut-out 25: First conveyor track
26: Second conveyor track

The invention claimed is:

1. A carrier puck for a conveyer system, the carrier puck comprising:
   a circular lower body, the circular lower body including a ring groove positioned above a lower contact surface of the circular lower body;
   an upper body attached to the circular lower body; and;
   a slide ring, the slide ring arranged in the ring groove and wherein the slide ring is operable to rotate within the ring groove relative to the circular lower body;
   wherein a largest diameter of the circular lower body is larger than an outer diameter of the slide ring, and
   wherein the lower contact surface of the carrier puck is adapted to bear on another puck or against another surface when the carrier puck is used in the conveyor system, and wherein the slide ring is adapted to cooperate with a handling unit.

2. The carrier puck according to claim 1, wherein the slide ring is provided with a set of roller elements arranged between the ring groove and the slide ring.

3. The carrier puck according to claim 1, wherein the carrier puck further includes an orientation ring having an orientation section adapted to rotate the carrier puck to a specific orientation in cooperation with an orientation rail, and a straight position section adapted to bear against the orientation rail.

4. The carrier puck according to claim 3, wherein the orientation section is provided with teeth.

5. The carrier puck according to claim 1, wherein the carrier puck further includes an identification device adapted to allow for identification of the carrier puck or the object carried by the carrier puck.

6. The carrier puck according to claim 1, wherein the circular lower body and the upper body include a detachable attachment device such that the upper body can be detached from the circular lower body.

7. The carrier puck according to claim 1, wherein the circular lower body and the upper body are fixedly mounted to each other.

* * * * *

UNITED STATES PATENT AND TRADEMARK OFFICE
CERTIFICATE OF CORRECTION

PATENT NO. : 8,695,791 B2  Page 1 of 1
APPLICATION NO. : 13/393769
DATED : April 15, 2014
INVENTOR(S) : Michael Öhman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 29 days.

Signed and Sealed this

Twenty-ninth Day of September, 2015

Michelle K. Lee
*Director of the United States Patent and Trademark Office*